(12) United States Patent
Jeon

(10) Patent No.: US 6,714,850 B2
(45) Date of Patent: Mar. 30, 2004

(54) METHOD OF CONTROLLING SHIFT ACTION IN UP-SHIFT MODE OPERATION OF AUTOMATIC TRANSMISSION FOR VEHICLES

(75) Inventor: Byeong-Wook Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/192,557

(22) Filed: Jul. 9, 2002

(65) Prior Publication Data

US 2003/0013570 A1 Jan. 16, 2003

(30) Foreign Application Priority Data

Jul. 11, 2001 (KR) .................................... 2001-0041596

(51) Int. Cl.7 .............................................. G06F 17/00
(52) U.S. Cl. ......................................................... 701/59
(58) Field of Search .......................................... 701/59

(56) References Cited

U.S. PATENT DOCUMENTS

| | | | | |
|---|---|---|---|---|
| 5,063,814 A | * | 11/1991 | Baba et al. .................... | 74/866 |
| 5,583,768 A | * | 12/1996 | Hamajima et al. ............ | 477/83 |
| 5,951,615 A | * | 9/1999 | Malson ........................ | 701/57 |
| 6,041,275 A | * | 3/2000 | Takiguchi .................... | 701/55 |
| 6,259,983 B1 | * | 7/2001 | Tsutsui et al. ................ | 701/51 |
| 6,577,940 B2 | * | 6/2003 | Saito et al. .................... | 701/59 |

* cited by examiner

*Primary Examiner*—Dirk Wright
(74) *Attorney, Agent, or Firm*—Morgan Lewis & Bockius LLP

(57) ABSTRACT

A method of controlling the shift action in an up-shift mode operation of an automatic transmission for vehicles is disclosed. The method appropriately controls such a shift action by a transmission control unit integrated with an engine control unit, thus restricting turbine blow-up during the shift action, stabilizing the learning process of turbine rpm blow-up, reducing an excessive blow-up learning value to an acceptable level, and thereby accomplishing desired smoothness of the shift action, in addition to improving durability of automatic transmissions.

14 Claims, 5 Drawing Sheets

FIG.4

| TURBINE TORQUE / BLOW-UP VALUE (%) | 30rpm | 50rpm | 100rpm | 200rpm | 300rpm |
|---|---|---|---|---|---|
| 80 | 95 % | 93 % | 90 % | 85 % | 80 % |
| 50 | 97 % | 95 % | 92 % | 90 % | 85 % |
| 30 | 98 % | 97 % | 94 % | 93 % | 90 % |
| 0 | 100 % | 100 % | 100 % | 100 % | 100 % |

METHOD OF CONTROLLING SHIFT ACTION IN UP-SHIFT MODE OPERATION OF AUTOMATIC TRANSMISSION FOR VEHICLES

FIELD OF THE INVENTION

The present invention relates, in general, to a method and apparatus for controlling the shift action during up-shift in an automatic transmission and, more particularly, to a method of appropriately controlling such a shift action by a transmission control unit integrated with an engine control unit.

BACKGROUND OF THE INVENTION

In the operation of vehicle automatic transmissions, a transmission control unit controls a plurality of solenoid valves to control the flow of transmission oil in accordance with the running speed of a vehicle, the throttle valve position and the other sensed operational conditions of the vehicle. This allows the gears of a desired transmission mode to automatically engage to transmit power. When a driver operates the shift lever of an automatic transmission to a desired stage while driving, the hydraulic ports of a manual valve are selectively opened under the duty control of solenoid valves to selectively actuate the drive parts of a shift gear mechanism using transmission oil fed from an oil pump, thus accomplishing a desired transmission mode.

During the shift action to accomplish a desired transmission mode, some frictional parts of the automatic transmission are changed from an engaged state to a disengaged state. Other frictional parts are changed from a disengaged state to an engaged state. The timing of engagement or disengagement of the frictional parts determines the power transmission performance of such an automatic transmission. Therefore, methods for controlling such a shift action have been actively studied in order to improve the power transmission performance of automatic transmissions in recent years.

The conventional automatic transmission for vehicles is designed to be shifted between lower and higher gears through three shift modes: an up-shift mode wherein the transmission is sequentially shifted into a higher gear through first-to-fourth up-shift in accordance with the running speed of a vehicle, a down-shift mode wherein the transmission is sequentially shifted into a lower gear through fourth-to-first down-shift, and a down skip-shift mode wherein the transmission is shifted into a lower gear through fourth-to-second skip-shift and third-to-first skip-shift.

During a shift action in the up-shift mode of a conventional automatic transmission, the desired run-up and smooth shift action are accomplished by appropriately controlling transmission oil pressure and pre-fill time. In order to accomplish the desired smooth shift action when turbine blow-up is generated during an up-shift in the prior art, the shift action in the up-shift mode has been controlled such that the duty-controlled oil pressure in an initial shift cycle are learned and corrected to increase the oil pressure in a next shift cycle. As used herein, blow-up or turbine blowup refers to a condition wherein turbine rpm rises abnormally during the up-shift.

However, the conventional method of controlling the shift action in the up-shift in an automatic transmission does not perform learning of turbine blow-up in proportion to the blow-up value or amount. In addition, conventional methods control the shift action in such an up-shift only by the learning of turbine blow-up, so it is necessary to undesirably endure turbine blow-up overspeed until the blow-up learning value converges to a desired value.

The conventional shift action control method does not have techniques for determining tie-up of turbine rpm, so it is impossible to reduce the excessive learning value of turbine blow-up when the learning of turbine blow-up is excessively performed. Therefore, it is inevitable to endure tie-up impact and reduce durability of the automatic transmissions due to such tie-up impact.

SUMMARY OF THE INVENTION

The present invention provides a method and apparatus of controlling the shift action in an up-shift mode of a vehicle automatic transmission, which appropriately controls the shift action in such an up-shift mode by a transmission control unit integrated with an engine control unit, thus restricting turbine blow-up during the shift action, stabilizing the learning of turbine blow-up, reducing an excessive learning value of blow-up to an acceptable level, and thereby accomplishing desired smoothness of the shift action, in addition to improving durability of automatic transmissions.

According to a preferred embodiment of the present invention controlling the shift action in an up-shift mode comprises determining whether a turbine blow-up amount or value is higher than a predetermined reference value when a shift command is applied during operation of the vehicle; performing blow-up learning control in proportion to the turbine blow-up amount, and performing engine torque reduction control when the blow-up amount is higher than the reference value; determining whether turbine rpm tie-up is generated when it is determined that the turbine blow-up amount is not higher than the reference value; performing tie-up learning control when it is determined that turbine rpm tie-up is generated; and performing a normal control when it is determined that turbine rpm tie-up is not generated.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a table showing engine torque reduction ratios in accordance with turbine blow-up amounts and turbine torques in the shift action control method of this invention;

DETAILED DESCRIPTION OF THE INVENTION

Figure 1:
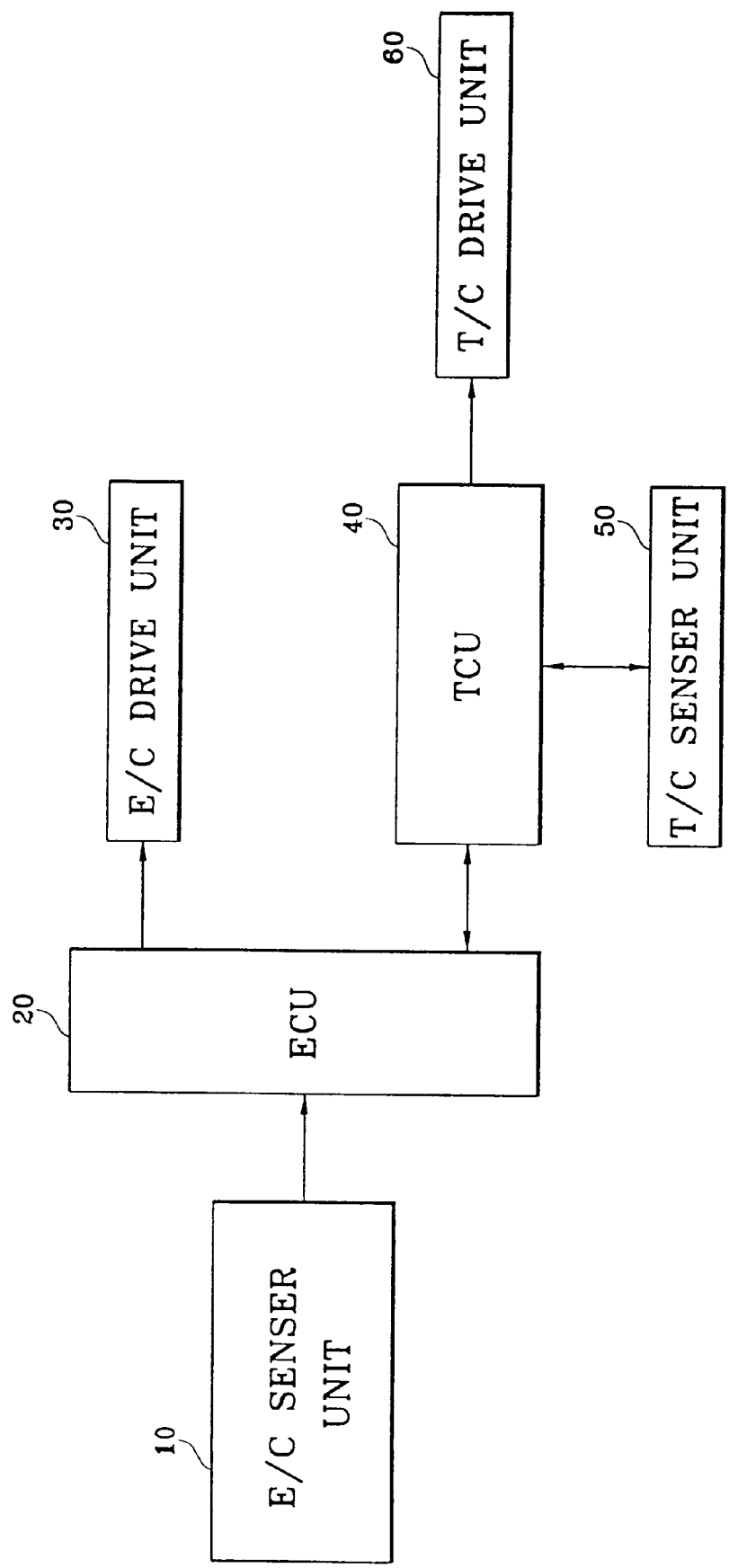
FIG. 1 is a block diagram of a control system in accordance with the present invention, with a transmission control unit (TCU) integrated with an engine control unit (ECU)

Reference now should be made to the drawings, in which the same reference numerals are used throughout the different drawings to designate the same or similar components.

As shown in FIG. 1, the control system of this invention has an engine control unit (ECU) 20 connected to an engine control sensor unit (E/C sensor unit) 10. During an operation of the control system, the sensors of the E/C sensor unit 10 sense operational conditions of the parts of a vehicle, and output signals to the ECU 20. Upon receiving the signals from the E/C sensor unit 10, the ECU 20 compares the input signals with stored data so as to control an engine control drive unit (E/C drive unit) 30 in accordance with comparison results, thus allowing the internal combustion engine of the vehicle to be optimally operated.

When there is information required to control the shift action of an automatic transmission, the ECU 20 outputs the information to a transmission control unit (TCU) 40 at the same time of outputting a control signal to the E/C drive unit 30 so as to allow the TCU 40 to control the shift action of the automatic transmission. Upon receiving the information from the ECU 20, the TCU 40 compares both the input information from the ECU 20 and input information from a transmission control sensor unit (T/C sensor unit) 50 with stored data, thus controlling a transmission control drive unit (T/C drive unit) 60 in accordance with comparison results. The TCU 40 thus optimally controls the shift action of the automatic transmission.

ECU 20 and TCU 40 preferably include a processor and memory as well as other conventional components for operation of the control units as described herein.

In the above control system, the E/C sensor unit 10 is used for obtaining information required to control the operation of the internal combustion engine, and includes a running speed sensor, a crank angle sensor, an engine rpm sensor, a turbine rpm sensor, a throttle position sensor, etc, in the same manner as a conventional E/C sensor unit. The T/C sensor unit 50 is used for obtaining information required to control the shift action of the automatic transmission, and includes input/output rotational speed sensors, an oil temperature sensor, an inhibitor switch, a brake switch, etc.

The E/C drive unit 30 includes a variety of drive parts for controlling the operation of the internal combustion engine, while the T/C drive unit 60 includes a plurality of solenoid valves for controlling the flow of pressurized transmission oil of the automatic transmission.

A variety of communication techniques may be used for accomplishing the communication of information from the ECU 20 to the TCU 40. One example of such communication techniques is CAN communication. CAN communication is a multiple communication of data through a CAN bus line, and transceives required information between the control units, that is, the ECU 20 and the TCU 40. When it is desired to transmit additional information to a control unit, the CAN communication effectively accomplishes the object by changing software without changing hardware.

In the above-mentioned control system, it is preferred to control the engagement and disengagement of frictional parts of the transmission to accomplish the shift action of the transmission while allowing the turbine rpm to be smoothly changed.

Figure 2:
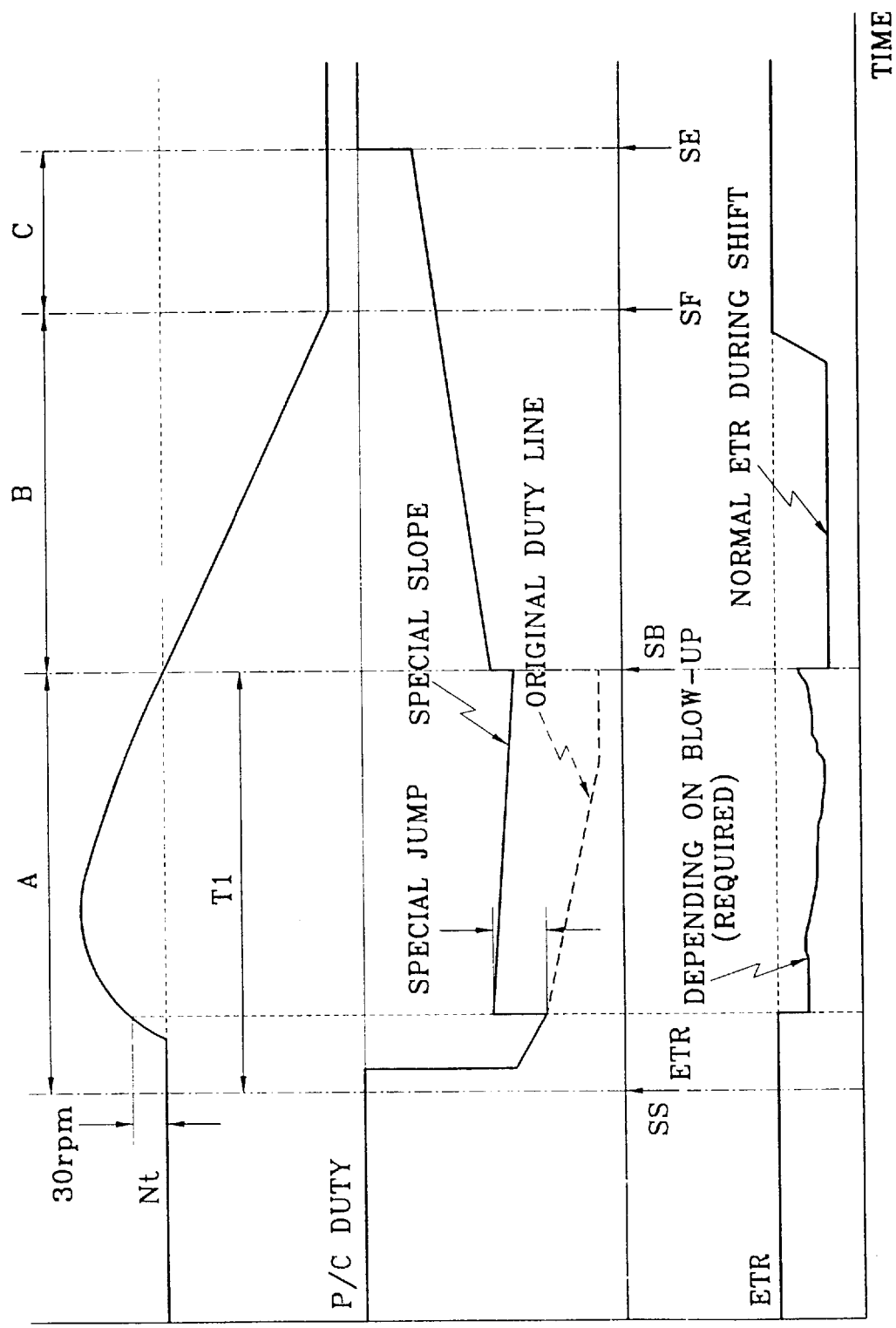
FIG. 2 is a graph showing a duty pattern in an up-shift mode operation of an automatic transmission according to the present invention.

As shown in FIG. 2, when a shift command for shifting the transmission from a lower gear to a higher gear is applied at time SS, the duty-controlled oil pressure (P/C Duty Curve) for the drive parts falls perpendicularly to a predetermined value, and is controlled such that the duty curve is inclined downward at a gradient. In such a case, turbine blow-up is generated such that the turbine rpm (Nt) is increased to a predetermined level. Thereafter, the turbine rpm is gradually reduced as the shift action is performed.

When the amount of turbine blow-up reaches 30 rpm, the oil pressure controlled by the solenoid valves is increased by a predetermined ratio (about 10%) and is gradually reduced at a predetermined gradient so as to remove the blow-up of the turbine. In addition, the engine torque (ETR) is reduced in accordance with the turbine blow-up. Such a control is shown in section A of the graph of FIG. 2.

The control of section A is to remove the turbine blow-up rpm. When the blowup is removed by the control at time SB, the duty-controlled oil pressure is increased perpendicularly to a duty value with the blow-up amount of 30 rpm, and is gradually increased at a predetermined gradient. Such a control is shown in section B of the graph. At time SB, the turbine blow-up is removed and the transmission starts a mechanical shift action. In section B, engine torque is normally reduced in the same manner as a normal engine torque control.

When the turbine rpm (Ne) is reduced to a desired rpm at time SF, the shift action control process is ended. The oil pressure duty control is continued for a predetermined period of time C until the oil pressure completely restores the initial pressure at time SE. At time SE, the mechanical shift action is completely accomplished.

Figure 3:
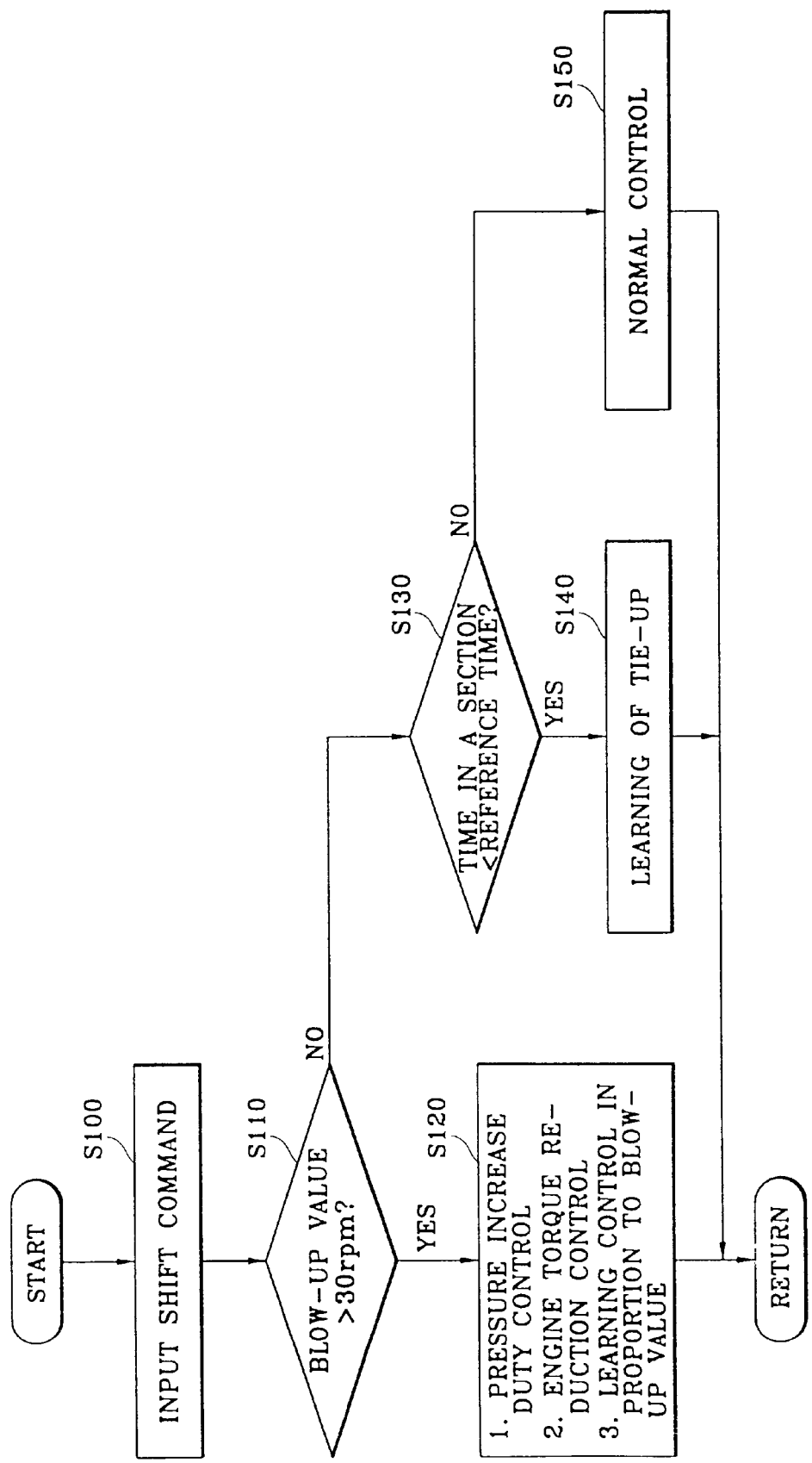
FIG. 3 is a flowchart of the control according to the present invention.

The shift action control method according to the present invention will be described in more detail herein below with reference to FIGS. 3 to 6. As shown in the flowchart of FIG. 3, an up-shift command is applied to the TCU 40 at step S100 and the TCU 40 determines whether the turbine blow-up is higher than 30 rpm at step S110.

When it is determined that the blow-up value of the turbine speed is higher than 30 rpm at step S110, duty control for restricting an increase in the oil pressure, engine torque reduction control, and turbine blow-up learning control in proportion to the blow-up amount are performed at step S120.

When it is determined that the blow-up is not higher than 30 rpm at step S110, TCU 40 determines, at step S130, whether the period of time of section A of the graph of FIG. 2 is less than a predetermined reference time. In such a case, section A starts at time SS, the shift command is applied to the TCU 40 and is terminated at time SB when the mechanical shift action is started.

When it is determined that the period of time of section A is less than the reference time at step S130, the TCU 40 performs a turbine rpm tie-up learning process at step S140. When it is determined that the period of time of the section A is not less than the reference time at step S130, the TCU 40 performs a normal control at step S150 prior to returning to the initial step.

The duty control for increasing oil pressure at step S110 is performed in the same manner as that described for section A of FIG. 2. In such a case, the engine torque reduction control is performed in proportion to the turbine blow-up amount as shown in the table of FIG. 4.

In a preferred embodiment, as shown in FIG. 4, the engine torque reduction ratio may be determined by two variables: turbine torque and turbine rpm blow-up value. When using the two variables, it is possible to obtain more preferred results in comparison with the case of using just the one variable of turbine blow-up value. In the table of FIG. 4, the units of turbine torque are expressed as a percentage (%). The percentage (%) of turbine torque is selected in the same manner as a conventional electromagnetic steering mechanism for vehicles where the turbine torque is expressed as a percent of a predetermined reference value. Of course, it should be understood that the unit of turbine torque is not limited to a percentage (%), but may be selected from any other units if the units can express the turbine torque.

When the engine torque reduction ratio (%) determined by both the turbine blow-up (rpm) and the turbine torque (%) is zero %, it indicates that torque reduction is at a minimum. When the engine torque reduction ratio (%) is 100%, there is no engine torque correction. Such an engine torque reduction control is performed by a retardation of ignition timing caused by an integration of the TCU 40 with the ECU 20.

Of course, the engine torque reduction ratios (%), the turbine blow-up amount (rpm) and the turbine torques (%) are not limited to the values shown in the table of FIG. 4, but may be changed in accordance with subject vehicle models and operational characteristics of automatic transmissions.

Figure 5:
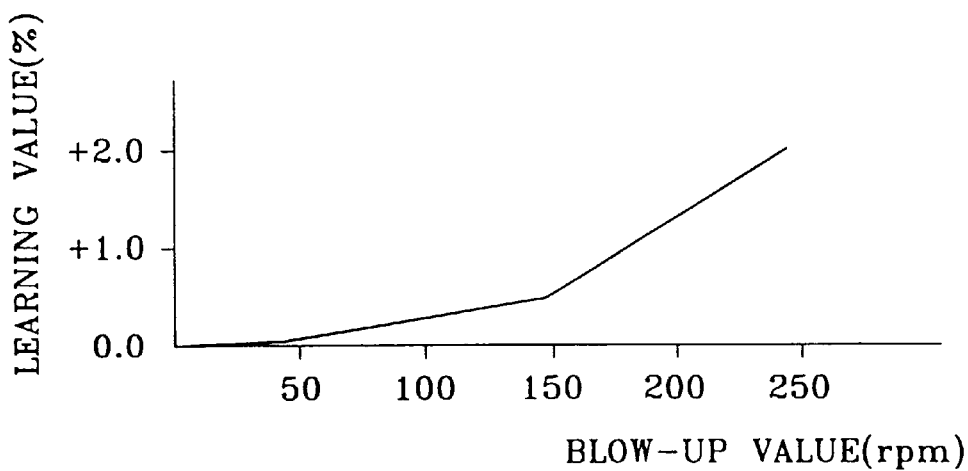
FIG. 5 is a graph showing the blow-up learning value as a function of the blowup amount when turbine blow-up is generated.
Figure 6:
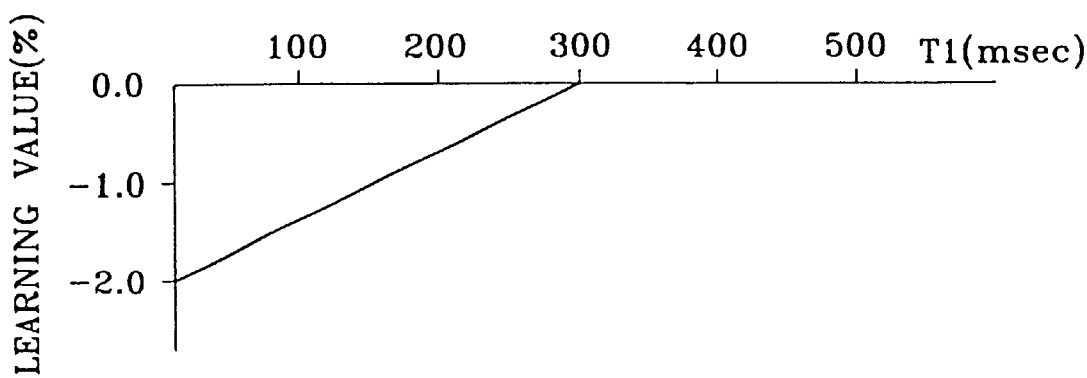
FIG. 6 is a graph showing the blow-up learning value as a function of time when turbine rpm tie-up is generated.

At step S120 blow-up learning control is performed in proportion to the turbine blow-up amount. The blow-up learning value, that is, the corrected value for increasing the oil pressure from the initial cycle is determined in accordance with the blow-up amount generated in section A from the time SS to time SB of FIG. 2, as shown in the graph of FIG. 5. In other words, when the turbine blow-up amount is not higher than 30 rpm, the blow-up learning value is maintained at zero. When the turbine blow-up amount is higher than 30 rpm, the blow-up learning value is increased in proportion to the turbine blow-up amount.

In the tie-up learning control performed at step S140, the tie-up learning value, that is, the corrected value for reducing the oil pressure from the initial cycle is determined in accordance with the period of time T1 from SS to SB of FIG. 2. In other words, when the period of time T1 is not less than a reference time of 300 msec, the tie-up learning value is maintained at zero. When the period of time T1 is less than 300 msec, the tie-up learning value is increased in a negative direction in inverse proportion to the period of time T1.

When blow-up or tie-up is determined from a map in the control process as described above, it is possible to learn the initial oil pressure in a next shift cycle as follows: When the final output value is set to Pr, reference map value to PrO, blow-up learning value to $\alpha$, and tie-up learning value to $\beta$, the final output value Pr is calculated by the following expression, $Pr=PrO+\alpha+\beta$.

The shift action control method according to the present invention controls the shift action as follows in an up-shift mode of an automatic transmission. First, when a turbine blow-up is generated before the time SB of FIG. 2, the control method directly increases the oil pressure to restrict an increase in the turbine rpm. In such a case, the control method learns the oil pressure for a next shift cycle in proportion to the blow-up amount.

Second, the control method reduces the engine torque during the blow-up occurrence, thus reducing the turbine blow-up time.

Third, when the period of time between SS and SB of FIG. 2 is excessively short under the condition that there is no turbine blow-up, the control system determines a generation of turbine tie-up rpm, and performs a tie-up learning control for reducing the oil pressure in a next shift cycle, thus accomplishing a smooth shift action, stabilizing the learning of turbine blow-up, reducing an excessive learning value of turbine blowup to an acceptable level, and improving durability of the automatic transmissions.

As described above, the present invention provides a method of controlling the shift action in an up-shift mode of an automatic transmission for vehicles. This control method appropriately controls the shift action in such an up-shift mode of the automatic transmission by a transmission control unit integrated with an engine control unit, thus restricting speed of turbine blow-up during the shift action, stabilizing the learning of turbine blow-up, reducing an excessive blow-up learning value to an acceptable level, and thereby accomplishing desired smoothness of the shift action, in addition to improving durability of automatic transmissions.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of controlling shift action in an up-shift mode of an automatic transmission for vehicles, comprising:

determining whether a turbine blow-up value is higher than a predetermined reference value when a shift command is applied during operation of the vehicle;

performing blow-up learning control in proportion to the turbine blow-up value when the blow-up value is higher than the reference value and performing engine torque reduction control during said performing blow-up learning control in proportion to the turbine rpm blow-up value.

2. The method according to claim 1, further comprising increasing transmission oil pressure to restrict turbine blow-up during said blow-up learning control in proportion to the turbine rpm blow-up value.

3. The method according to claim 1, further comprising, when the turbine blow-up value is not higher than the reference value, determining that turbine rpm tie-up is generated, and performing tie-up learning control to reduce an excessively corrected blow-up learning value to an acceptable value.

4. The method according to claim 3, wherein the tie-up learning control comprises determining whether a period of time from a shift command to when a mechanical shift action begins is less than a predetermined reference time.

5. The method according to claim 4, wherein a normal control is performed when the period of time from the shift command to the mechanical shift action is not less than the reference time.

6. A method of controlling shift action in an up-shift mode of an automatic transmission for vehicles, comprising:

determining whether a turbine blow-up amount is higher than a predetermined reference value when a shift command is applied;

performing blow-up learning control in proportion to the turbine blow-up amount, and performing engine torque reduction control when the blow-up amount is higher than the reference value;

determining whether turbine rpm tie-up is generated when it is determined that the turbine blow-up amount is not higher than the reference value;

performing tie-up learning control when it is determined that turbine rpm tie-up is generated; and performing a normal control when it is determined that turbine rpm tie-up is not generated.

7. The method according to claim 6, wherein said blow-up learning control comprises obtaining a corrected value for increasing oil pressure in a next shift cycle.

8. The method according to claim 6, wherein said tie-up learning control comprises determining whether a period of time from a shift command to when a corresponding mechanical shift action begins is less than a predetermined reference time.

9. The method according to claim 6, wherein said tie-up learning control comprises obtaining a corrected value for reducing oil pressure in a next shift cycle.

10. A method of controlling shift action in an up-shift mode of an automatic transmission for vehicles, comprising:

performing a mechanical shift action for an automatic transmission from a lower gear to a higher gear in response to a shift command;

monitoring turbine rpm during said mechanical shift action;

monitoring time between the shift command and initiation of said mechanical shift action;

determining whether said turbine rpm is greater than a reference rpm;

determining whether said time is less than a reference time when said turbine rpm is less than said reference rpm;

performing tie-up learning control when said time during said mechanical shift action is less than said reference time;

performing a normal control when said time during said mechanical shift action is not less than said reference time and increasing transmission oil pressure and reducing engine torque in proportion to said turbine rpm when said turbine rpm is greater than said reference rpm.

11. The method according to claim 10, further comprising performing blow-up learning control when said turbine rpm is greater than said reference rpm.

12. The method according to claim 11, wherein said performing blow-up learning control comprises increasing said transmission oil pressure in proportion to said turbine rpm in a next mechanical shift action.

13. The method according to claim 10, wherein said performing tie-up learning control comprises reducing said transmission oil pressure in proportion to said turbine rpm in a next mechanical shift action.

14. The method according to claim 10, wherein said normal control comprises no adjustment in said transmission oil pressure for a next mechanical shift action.

* * * * *